US009473683B2

(12) United States Patent
Matsumoto et al.

(10) Patent No.: US 9,473,683 B2
(45) Date of Patent: Oct. 18, 2016

(54) IMAGE CAPTURE APPARATUS, LENS UNIT, COMMUNICATION CONTROLLING METHOD, AND DIAPHRAGM CONTROLLING METHOD

(71) Applicant: CANON KABUSHIKI KAISHA, Tokyo (JP)

(72) Inventors: Yukihiro Matsumoto, Kawaguchi (JP); Terutake Kadohara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 13/869,239

(22) Filed: Apr. 24, 2013

(65) Prior Publication Data

US 2013/0286235 A1 Oct. 31, 2013

(30) Foreign Application Priority Data

Apr. 26, 2012 (JP) ................................ 2012-101670
Jun. 7, 2012 (JP) ................................ 2012-130100

(51) Int. Cl.
H04N 5/225 (2006.01)
H04N 5/232 (2006.01)
H04N 5/238 (2006.01)
H04N 5/235 (2006.01)

(52) U.S. Cl.
CPC ............ *H04N 5/2254* (2013.01); *H04N 5/238* (2013.01); *H04N 5/2352* (2013.01); *H04N 5/23209* (2013.01); *H04N 5/23251* (2013.01)

(58) Field of Classification Search
CPC .. H04N 5/238; H04N 5/2351; H04N 5/2352; H04N 5/2354; H04N 5/23209
USPC ................................................. 348/360, 345
See application file for complete search history.

(56) References Cited

U.S. PATENT DOCUMENTS

| 2009/0185070 | A1* | 7/2009 | Murakami et al. ........... 348/363 |
| 2009/0268082 | A1 | 10/2009 | Shibuno |
| 2009/0284612 | A1* | 11/2009 | Abe et al. .................. 348/221.1 |
| 2009/0295940 | A1* | 12/2009 | Shibuno ..................... 348/226.1 |
| 2010/0232779 | A1* | 9/2010 | Okamoto et al. ............. 396/257 |
| 2011/0044682 | A1* | 2/2011 | Kawanami ................... 396/439 |
| 2011/0069946 | A1* | 3/2011 | Honjo .................... G02B 7/282 396/135 |
| 2011/0080488 | A1* | 4/2011 | Okamoto et al. .......... 348/220.1 |
| 2011/0090393 | A1* | 4/2011 | Kawarada ..................... 348/345 |

(Continued)

FOREIGN PATENT DOCUMENTS

EP 2270571 A1 1/2011
JP 2000-206585 A 7/2000

(Continued)

*Primary Examiner* — Abdelaaziz Tissire
(74) *Attorney, Agent, or Firm* — Canon USA Inc. IP Division

(57) ABSTRACT

An image capture apparatus with a detachable lens includes a communication unit capable of switching a communication mode used in communication with the mounted lens unit between a first communication mode of transmitting first control information to the mounted lens unit and a second communication mode of transmitting a second control information different from the first control information to the mounted lens unit, and a control unit configured to control a communication with the mounted lens unit, wherein the control unit controls the communication such that, until the control started based on either one of the first control information and the second control information is ended, the other one of the first control information and the second control information is not transmitted.

27 Claims, 13 Drawing Sheets

(56) References Cited

U.S. PATENT DOCUMENTS

| | | | | |
|---|---|---|---|---|
| 2011/0229117 A1* | 9/2011 | Hirai | ............... | G03B 17/14 396/257 |
| 2011/0310457 A1 | 12/2011 | Sasaki | | |
| 2011/0317990 A1 | 12/2011 | Imafuji | | |
| 2012/0105711 A1* | 5/2012 | Kudo | ............... | H04N 5/23209 348/360 |
| 2015/0109471 A1* | 4/2015 | Kudo | ............... | H04N 5/23209 348/211.99 |

FOREIGN PATENT DOCUMENTS

| | | |
|---|---|---|
| JP | 2008-282510 A | 11/2008 |
| JP | 2009-258481 A | 11/2009 |
| JP | 2009-258558 A | 11/2009 |
| JP | 2010-014814 A | 1/2010 |
| JP | 2012-008307 A | 1/2012 |
| JP | 2012-073622 A | 4/2012 |
| JP | 2012-093712 A | 5/2012 |
| WO | 2009/130849 A1 | 10/2009 |
| WO | 2009/139118 A1 | 11/2009 |
| WO | 2009/139173 A1 | 11/2009 |
| WO | 2009/139192 A1 | 11/2009 |

* cited by examiner

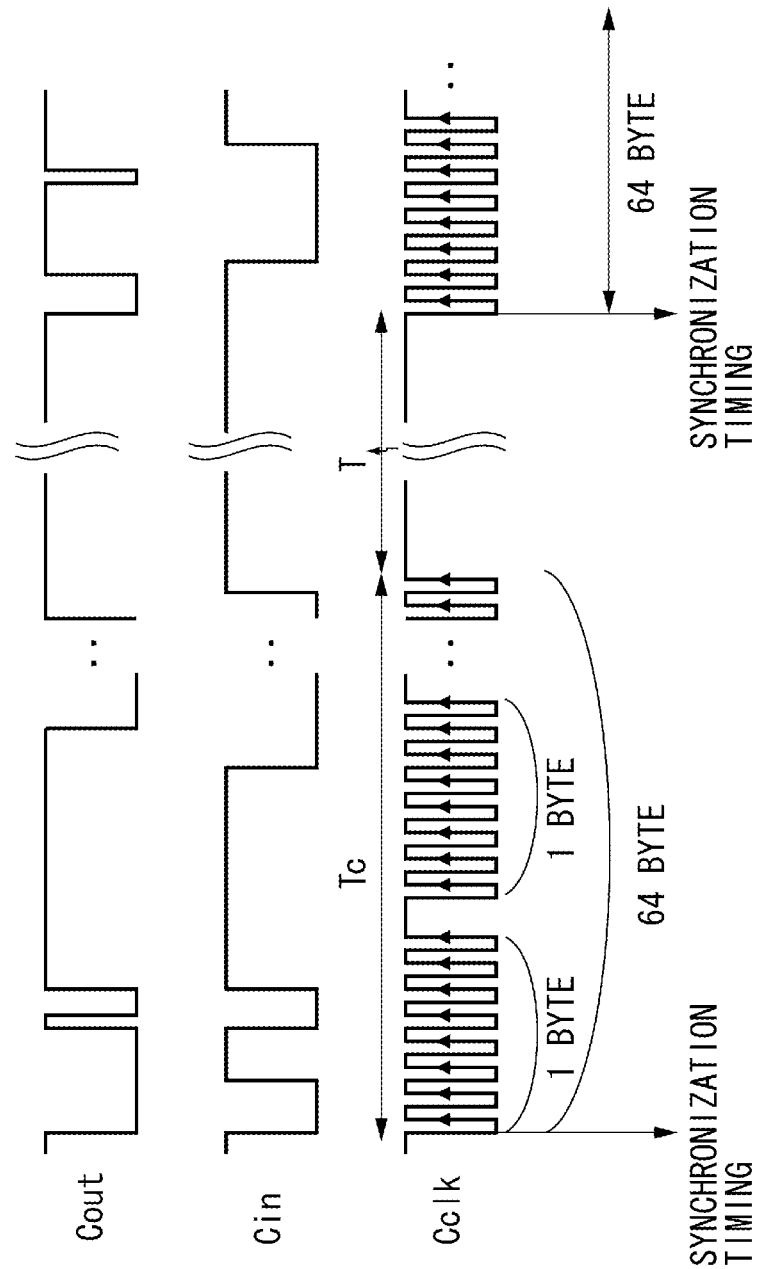

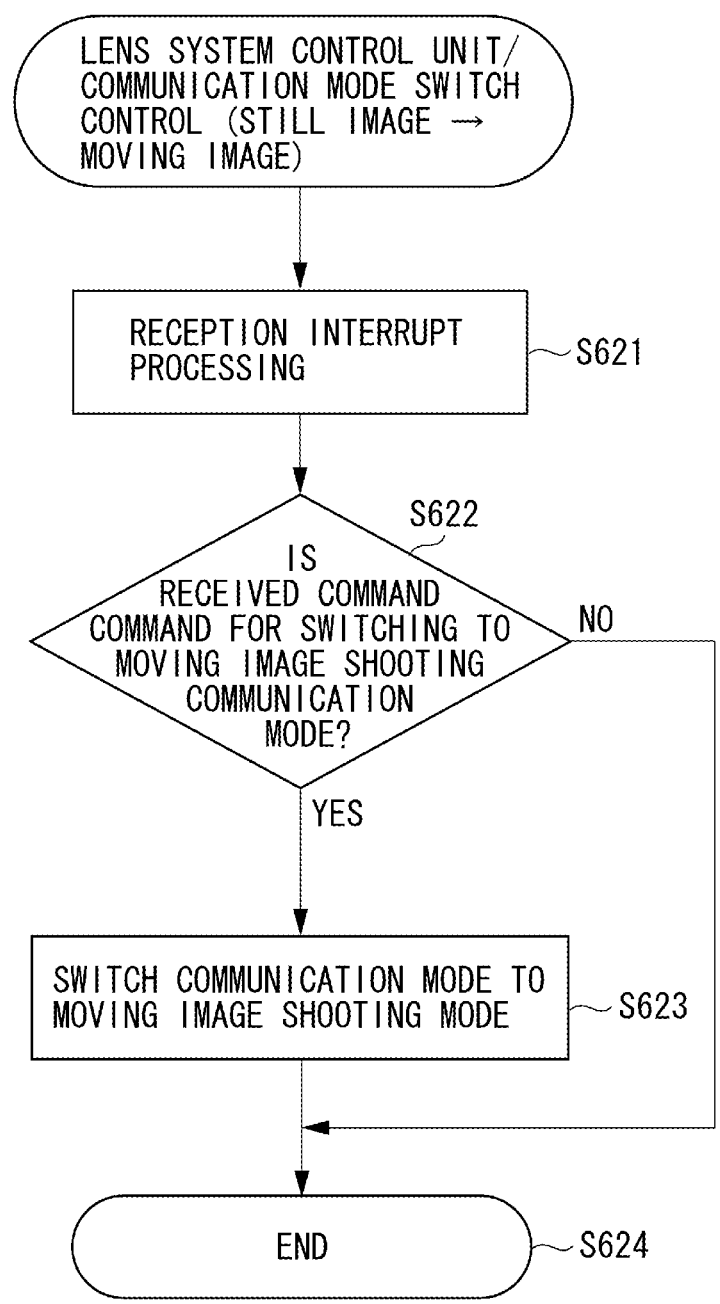

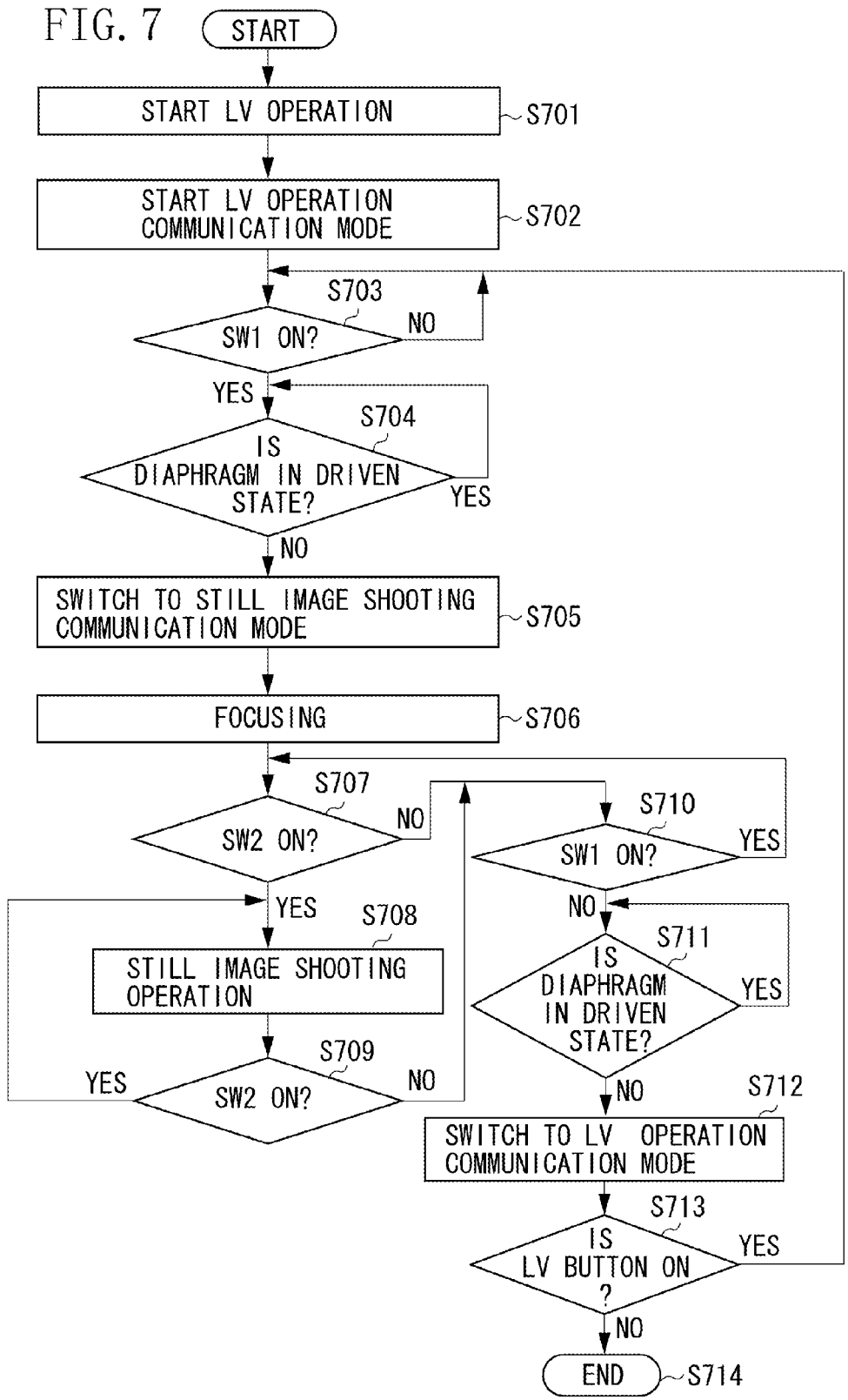

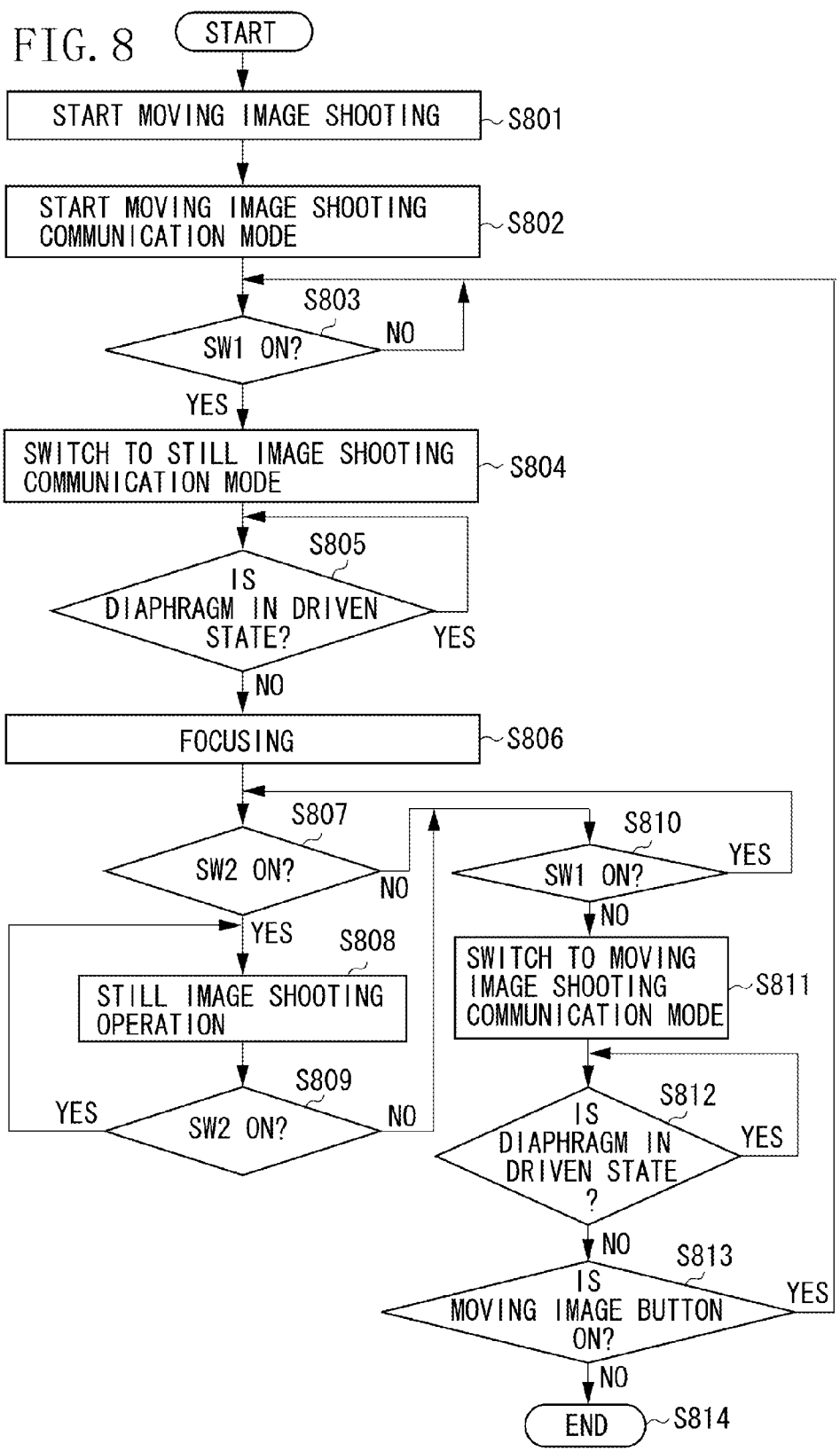

IMAGE CAPTURE APPARATUS, LENS UNIT, COMMUNICATION CONTROLLING METHOD, AND DIAPHRAGM CONTROLLING METHOD

BACKGROUND OF THE INVENTION

1. Field of the Invention

The present invention relates to an image capture apparatus for establishing a communication between an image capture apparatus and a lens unit to control the lens unit, the lens unit, a communication controlling method, and a diaphragm controlling method for the same.

2. Description of the Related Art

The conventional image capture apparatus equipped with a detachable lens unit (hereinafter referred to as "interchangeable-lens camera) is mainly directed to capture a still image and a communication mode suitable for capturing a still image is used as a communication mode of controlling a mounted lens unit. However, recently, a product capable of capturing a moving image has been wanted in a field of an interchangeable-lens camera and thus a control of a lens unit suitable for capturing a moving image is wanted in the interchangeable-lens camera. However, the mode of communicating with the lens unit in the conventional interchangeable-lens camera is adapted to a communication mode suitable for capturing a still image, so that the control of the lens unit by using the conventional communication mode has not been suitable for capturing a moving image. Japanese Patent Application Laid-Open Publication No. 2009-258558 discusses a method for using a plurality of communication modes in capturing a moving image since an increased communication traffic is required in capturing a moving image more than in capturing a still image; however, a control for switching the communication mode or a control of diaphragm are not considered in the method.

SUMMARY OF THE INVENTION

The present invention is directed to a method capable of precisely controlling a lens unit by switching a communication mode between an image capture apparatus and a lens unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates a communication mode suitable for capturing a moving image and in a live view (LV) operation between the image capture apparatus and the lens unit.

FIG. 5 includes FIGS. 5A and 5B.

FIG. 6 includes FIGS. 6A and 6B. FIGS. 6A and 6B are flow charts each illustrating a switch control from the communication mode suitable for capturing a still image to the communication mode suitable for capturing a moving image and in an LV operation.

FIG. 7 is a flowchart illustrating various processing to be executed at a side of the image capture apparatus in a case where a shutter button is operated in an LV operation.

FIG. 8 is a flowchart illustrating various processing to be executed at a side of the image capture apparatus in a case where the shutter button is operated while capturing a moving image.

DESCRIPTION OF THE EMBODIMENTS

Various exemplary embodiments, features, and aspects of the invention will be described in detail below with reference to the drawings.

Figure 1:
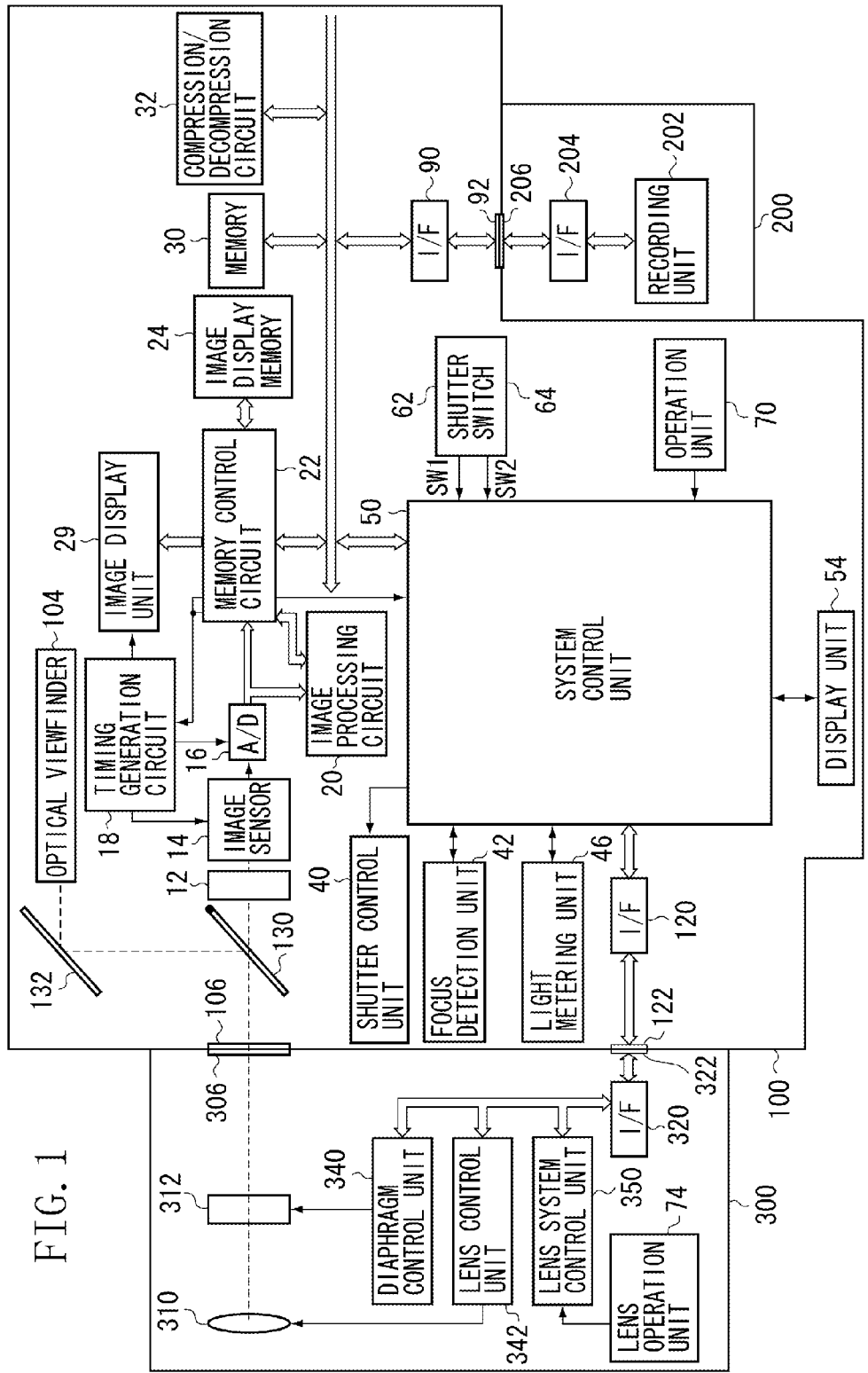
FIG. 1 is a block diagram illustrating a configuration of a camera system according to an exemplary embodiment of the present invention.

FIG. 1 is a block diagram illustrating a configuration of a camera system according to a first exemplary embodiment. In the camera system in FIG. 1, an image capture apparatus 100 is detachably mounted with a recording medium 200 and a lens unit 300.

A configuration of the image capture apparatus 100 is described below. An image sensor 14 receives light which has passed through an imaging lens 310 of the lens unit 300 to convert an optical image of an object into an electrical signal (i.e., to capture an image of an object). A shutter 12 is disposed on a front side of the image sensor 14 to be used for adjusting an exposure time of the image sensor 14.

Mirrors 130 and 132 reflect light which has passed through the imaging lens 310 of the lens unit 300 to guide the light to an optical viewfinder 104. By looking into the optical viewfinder 104, a user can confirm a composition of the image of the object. The mirror 130 is retracted from a light path so that the light which has passed through the imaging lens 310 can reach the image sensor 14 in capturing a still image, in capturing a moving image, and during a live view operation (LV operation) in which images sequentially captured by the image sensor 14 are displayed on an image display unit 29 in series. Generally, the captured images sequentially captured by the image sensor 14 are also displayed on the image display unit 29 in series in a case of capturing a moving image. However, in capturing a moving image, the captured image is recorded, which is a different point from the LV operation. The mirrors 130 and 132 are not essential if the image capture apparatus 100 has a configuration that requires no optical viewfinder 104 or a configuration in which the light which has passed through an optical system different from the lens unit 300 is guided to the optical viewfinder 104.

An analog-to-digital (A/D) converter 16 converts an analog signal output from the image sensor 14 into a digital signal. A timing generation circuit 18 is controlled by a memory control circuit 22 and a system control unit 50 to supply a control signal to each of the image sensor 14, the A/D converter 16, and the system control unit 50. The control signal of the timing generation circuit 18 is supplied also to the system control unit 50, so that the system control unit 50 can know timing when to control image shooting operation from the control signal. The system control unit 50 generates a vertical synchronizing signal (hereinafter referred to as "VD signal") in capturing a moving image and in an LV operation based on the control signal. In capturing a moving image and in an LV operation, the system control unit 50 controls the image sensor 14 and the image processing circuit 20 in synchronization with the VD signal.

The image processing circuit 20 performs image processing such as pixel interpolation processing and color conversion processing to image data output from the A/D converter 16 or the memory control circuit 22. The image processing circuit 20 calculates an integrated value based on the image data obtained by converting an analog signal output from the image sensor 14 into a digital signal by means of the A/D converter 16. The integrated value represents an integrated value of an electrical signal photoelectrically converted by the image sensor 14. The system control unit 50 calculates luminance of the object based on the integrated value calculated by the image processing circuit 20 to perform automatic exposure (AE) processing, in capturing a moving image and in an LV operation. The system control unit 50 performs the automatic focus (AF) processing based on the image data subjected to various processing by the image processing circuit 20, in capturing a moving image and in an LV operation. Even at the time of capturing a still image, in a case where a moving image is captured or the still image is captured continuously following the LV operation, the AF processing may be performed based on the image data after being subjected to various processing by the image processing circuit 20.

The present exemplary embodiment is equipped with a focus detection unit 42 and a light metering unit 46 independently and each of the AF processing and the AE processing is performed by using the outputs of the focus detection unit 42 and the light metering unit 46 in capturing a still image.

The memory control circuit 22 controls the A/D converter 16, the timing generation circuit 18, the image processing circuit 20, an image display memory 24, a digital-to-analog (D/A) converter 26, a memory 30, and a compression/decompression circuit 32.

The image data output from the A/D converter 16 is written into the image display memory 24 or the memory 30 via the image processing circuit 20 and the memory control circuit 22 or directly via the memory control circuit 22.

The image display unit 29 comprises, for example, a thin film transistor liquid crystal display (TFT LCD) and displays the captured image based on the image data captured by the image sensor 14. In capturing a moving image and in an LV operation, images captured based on the image data sequentially captured by means of the image sensor 14 can be continuously displayed, so that a user can confirm a composition of the captured image viewing the image displayed on the images display unit 29.

The memory 30 stores the captured still image and moving image and thus has a sufficient storage capacity to store a predetermined number of still images and a predetermined length of moving image. The memory 30 can be used also as a work area of a system control unit 50.

The compression/decompression circuit 32 compresses/decompresses image data by, for example, an adaptive discrete cosine transform (ADCT). The compression/decompression circuit 32 reads the image data stored in the memory 30 to perform the compression processing or the decompression processing on the image data and writes the resulting image data into the memory 30.

A shutter control unit 40 controls travelling timing of a shutter 12 according to an instruction from the system control unit 50.

The focus detection unit 42 includes a focus detection sensor for detecting focuses at a plurality of portions within an image frame. The system control unit 50 performs the AF processing of a phase-difference detection method based on an output from the focus detection unit 42 which indicates a detection result obtained by the focus detection sensor.

The light metering unit 46 includes a light metering sensor for metering light at a plurality of positions within the image frame. The system control unit 50 performs the AE processing based on an output from the light metering unit 46 which indicates a light metering result obtained by the light metering sensor.

A display unit 54 outputs an operational state and a message displaying in the form of characters and/or images or using sound by the system control unit 50 implementing a program. The display unit 54 is made of a combination of, for example, a liquid crystal display (LCD) or a light emitting diode (LED) and a sound generation element, and is disposed singularly or a plurality of them is disposed at a position visually confirmable around an operation unit of the image capture apparatus 100. A function of the display unit 54 may be partially disposed within the optical viewfinder 104.

A shutter switch SW1 62 is turned on during an operation of a shutter button included in an operation unit 70. With the shutter switch SW1 62 turned on, the system control unit 50 causes the image capture apparatus 100 to start a shooting preparation operation such as the AF processing and the AE processing.

A shutter switch SW2 64 is turned on when an operation of a shutter button is completed. With the shutter switch SW2 64 turned on, the system control unit 50 causes the image capture apparatus 100 to start a series of shooting processing (i.e., exposure processing, development processing, and recording processing). In the exposure processing, a signal readout from the image sensor 14 is written into the memory 30 as image data via the A/D converter 16 and the memory control circuit 22. The development processing is performed by calculation in the image processing circuit 20 and the memory control circuit 22. In the recording processing, image data is read out from the memory 30 and the read out image data is compressed by the compression/decompression circuit 32 to be written into a recording medium 200.

The operation unit 70 is equipped with a shutter button for capturing a still image, an LV button for starting and ending the LV operation, a moving image button for capturing a moving image, a power switch, and a mode dial for switching image shooting mode.

An interface unit 90 controls an interface between the image capture apparatus 100 and the recording medium 200. A connector 92 is connected to a connector 206 of the recording medium 200 to electrically connect the image capture apparatus 100 to the recording medium 200.

An interface unit 120 connects the image capture apparatus 100 to a lens unit 300 within a lens mount 106. A connector 122 is connected to a connector 322 of the lens unit 300, thereby electrically connecting the image capture apparatus 100 to the lens unit 300. As a result, a communication between the image capture apparatus 100 and the lens unit 300 can be established.

The communication between the lens unit 300 and the image capture apparatus 100 via the connectors 322 and 122 includes a communication mode (i.e., a first communication mode) suitable for capturing a still image and a communication mode (i.e., a second communication mode) suitable for capturing a moving image and an LV operation. A system control unit 50 switches the communication mode according to an operation mode of the image capture apparatus 100. The system control unit 50 switches information between diaphragm control information indicative of a driving amount of a diaphragm 312 and diaphragm control information indicative of an aperture value to be targeted (i.e., a target aperture value) as diaphragm control information for controlling the diaphragm 312 of the lens unit 300 according to the switching of the communication mode.

A configuration of the lens unit 300 is described below. The lens unit 300 is an interchangeable lens detachable from the image capture apparatus 100. The diaphragm 312 adjusts light quantity of the light which has passed through the imaging lens 310 by changing a diameter of an opening.

A lens mount 306 mechanically couples the lens unit 300 with the image capture apparatus 100 and includes various functions for electrically connecting the lens unit 300 to the image capture apparatus 100.

An interface unit 320 connects the lens unit 300 to the image capture apparatus 100 within the lens mount 306. The connector 322 is connected to the connector 122 of the image capture apparatus 100, thereby electrically connecting the lens unit 300 to the image capture apparatus 100. Accordingly, a communication can be established between the image capture apparatus 100 and the lens unit 300.

A diaphragm control unit 340 controls the diaphragm 312 according to an instruction from the system control unit 50 or the lens system control unit 350.

The lens control unit 342 controls focusing and zooming of the imaging lens 310 according to the instruction from the system control unit 50 or the lens system control unit 350.

A lens operation unit 74 includes a zoom ring and an AF mode selection switch for changing a focal length of the imaging lens. An AF mode selection switch switches over to cause the lens control unit 342 to automatically perform or not to automatically perform a focusing control of the imaging lens 310.

A lens system control unit 350 controls the lens unit 300 in its entirety. The lens system control unit 350 determines a communication mode between the image capture apparatus 100 and the lens unit 300. In a case where the lens system control unit 350 determines that the communication mode is suitable for capturing a still image, the lens system control unit 350 further determines that diaphragm control information (i.e., first control information) notified from the image capture apparatus 100 is a driving amount of the diaphragm 312 and instructs the diaphragm control unit 340 to drive the diaphragm 312 by an amount corresponding to the notified diaphragm control information. In a case where the lens system control unit 350 determines that the communication mode is suitable for capturing a moving image or an LV operation, the lens system control unit 350 further determines that the diaphragm control information (i.e., second control information) notified from the image capture apparatus 100 is an aperture value to be targeted (i.e., target aperture value). Subsequently, the lens system control unit 350 calculates a driving amount of the diaphragm 312 necessary for changing a current aperture value to the target aperture value and instructs the diaphragm control unit 340 to drive the diaphragm 312 by a calculated driving amount so that an aperture value becomes the value indicated by the notified diaphragm control information.

When the communication mode suitable for capturing a moving image and an LV operation is used, the lens system control unit 350 determines whether the full aperture value of the lens unit 300 changes due to the change of the focal length of the imaging lens 310 according to an operation of the zoom ring of the lens operation unit 74. In a case where the lens system control unit 350 determines that the full aperture value changes, the lens system control unit 350 calculates an amount of change of an effective aperture value to control the diaphragm 312 based on the calculated change amount so that the diaphragm 312 has the notified target aperture value, according to the change of the focal length of the imaging lens 310. The change of the full aperture value according to the change of the focal length and the diaphragm control according to the change of the full aperture value are described below.

The lens system control unit 350 transmits various pieces of information to the system control unit 50 via the connector 322. In the communication mode suitable for capturing a still image, the lens system control unit 350 makes a response to a request from the system control unit 50. In the communication mode suitable for capturing a moving image and an LV operation, while the image capture apparatus 100 is capturing a moving image or performing an LV operation, the system control unit 50 and the lens system control unit 350 synchronize with the VD signal to establish a bidirectional communication therebetween, thereby confirming a mutual state and a command.

The recording medium 200 comprises, for example, a memory card or a hard disk drive. The recording medium 200 is equipped with a recording unit 202 comprising a semiconductor memory or a magnetic disk, an interface unit 204 for controlling an interface with the image capture apparatus 100, and a connector 206 for connecting with the image capture apparatus 100.

Figure 2:
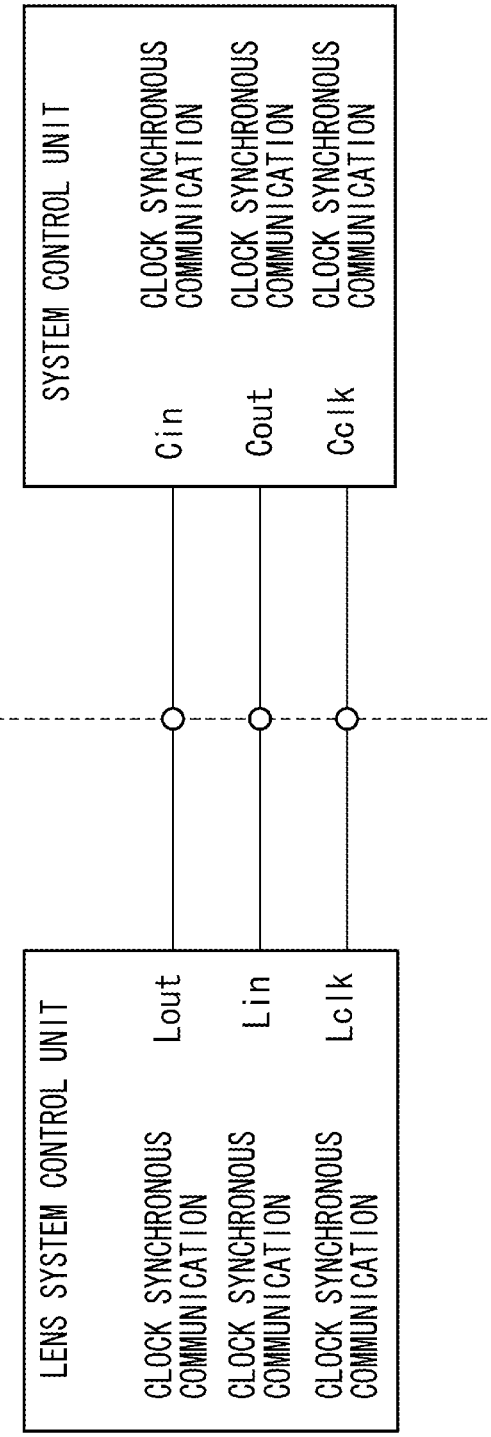
FIG. 2 illustrates communication lines extending between an image capture apparatus and a lens unit.

FIG. 2 illustrates a communication lines between the image capture apparatus 100 and the lens unit 300. The image capture apparatus 100 and the lens unit 300 establish a communication utilizing a three wire synchronous communication method via the connectors 122 and 322. In FIG. 2, the upper two lines among the signal lines are data signal lines and the lowermost line is a synchronous clock signal line. Lout represents an output signal line for outputting a signal from the lens unit 300 to the image capture apparatus 100. This line becomes an input signal line at a side of the image capture apparatus 100 and thus is represented by Cin. Lin represents an input signal line at a side of the lens unit 300, whereas, the line becomes an output signal line at the side of the image capture apparatus 100 and thus is represented by Cout. A signal line of a synchronous clock is represented by Lclk at the side of the lens unit 300, whereas it is represented by Cclk at the side of the image capture apparatus 100. By using these three signal lines, the communication mode suitable for capturing a still image and the communication mode suitable for capturing a moving image and an LV operation are realized.

Figure 3:
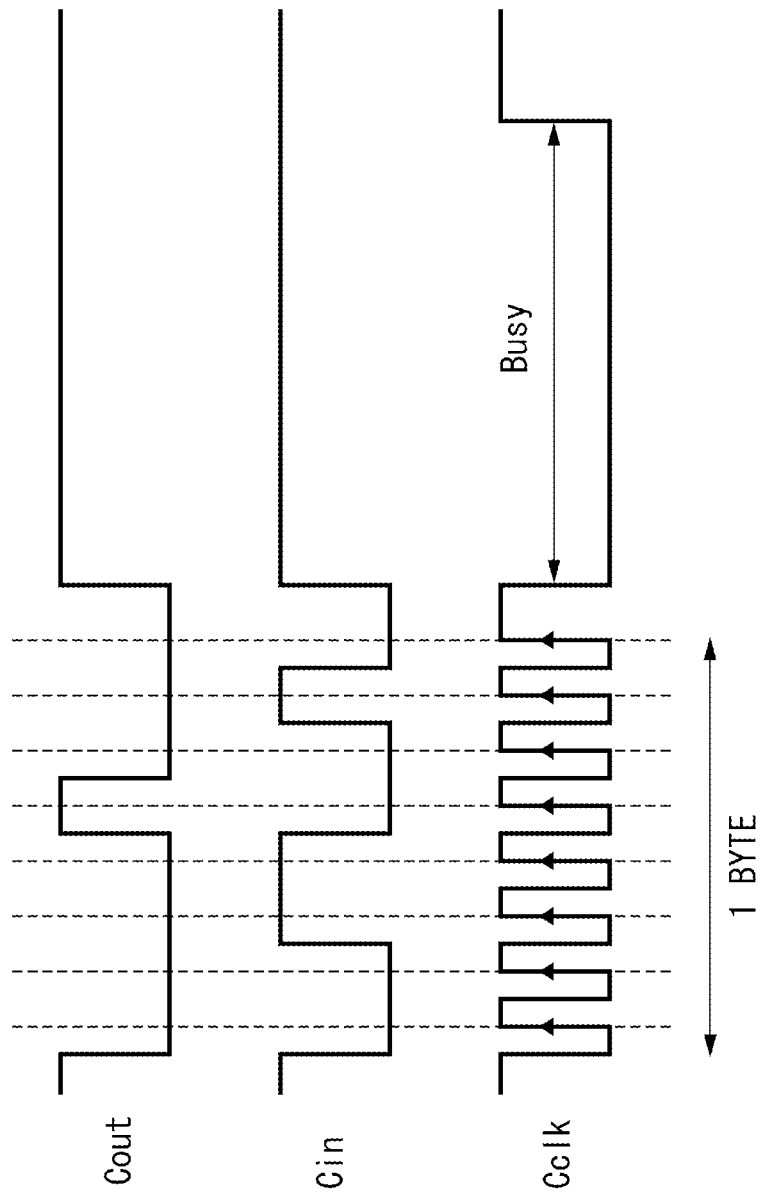
FIG. 3 illustrates a communication mode suitable for capturing a still image between the image capture apparatus and the lens unit.

FIG. 3 illustrates the communication mode suitable for capturing a still image between the image capture apparatus 100 and the lens unit 300. In FIG. 3, each signal line corresponds to each signal line at the side of the image capture apparatus 100 as illustrated in FIG. 2.

In the communication mode suitable for capturing a still image, a communication in a unit of 1 byte accompanied with a Busy period is repeated a predetermined essential number of times per control command. Each bit data is mutually defined at rising timing of the synchronous clock signal. The sum of data treated in the communication in capturing a still image is basically several bytes and, in many cases, is relatively small compared with the sum of data treated in the communication in capturing a moving image.

FIG. 4 illustrates a communication mode suitable for capturing a moving image and an LV operation between the image capture apparatus 100 and the lens unit 300. Each signal line in FIG. 4 corresponds to each signal line on aside of the image capture apparatus 100 illustrated in FIG. 2. Each of a period in capturing a moving image and a period of the LV operation is composed of a period Tc containing a synchronous clock signal and a period T containing no synchronous clock signal and a communication of 64 bytes is established in the period Tc. Further, a period combining the Tc and the T is defined as synchronization timing with one frame period of an imaging signal in capturing a moving image and in an LV operation. Therefore, the period T including no synchronous clock signal plays a coordinating role between synchronization timings different from each other according to a frame rate. Each bit data is mutually defined at rising timing of the synchronous clock signal in a similar manner as that in capturing a still image. A communication per frame is required because not only the diaphragm 312 needs to be precisely positioned in capturing one image, i.e., in capturing a still image, but also the diaphragm 312 and the imaging lens 310 are always required to be controlled smoothly in capturing a moving image and in an LV operation.

A switch control for switching a communication mode from the communication mode suitable for capturing a moving image and an LV operation to the communication mode suitable for capturing a still image is described below with reference to FIG. 5.

Figure 5A:
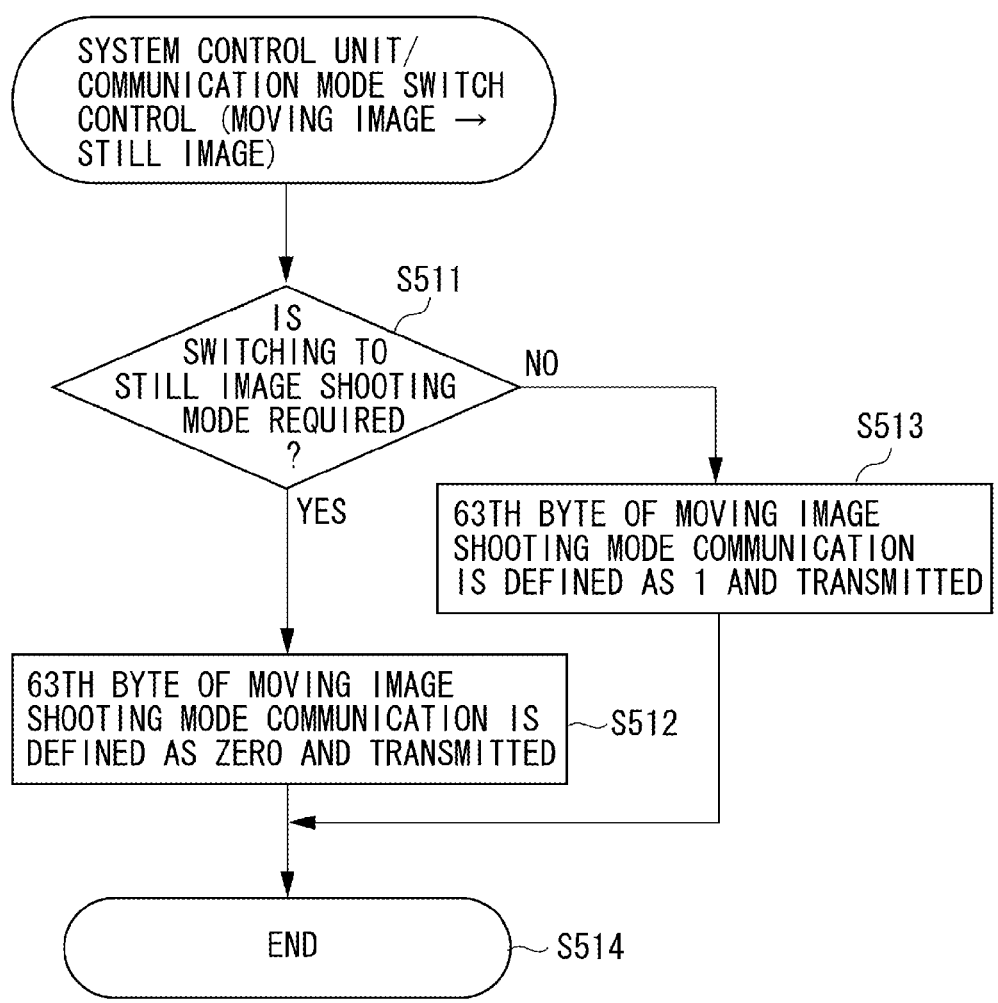
FIGS. 5A and 5B are flow charts each illustrating a switch control from the communication mode suitable for capturing a moving image and in an LV operation, to the communication mode suitable for capturing a still image.

FIG. 5A is a flow chart illustrating a switch control for switching a communication mode from the communication mode suitable for capturing a moving image and an LV operation to the communication mode suitable for capturing a still image, in a case of the switch control executed by the system control unit 50. Similarly, FIG. 5B is a flow chart illustrating a switch control for switching a communication mode from the communication mode suitable for capturing a moving image and an LV operation to the communication mode suitable for capturing a still image, in a case of the switch control executed by the lens system control unit 350.

In the flow chart illustrated in FIG. 5A, in step S511, the system control unit 50 determines whether a switch-over is necessary from the communication mode suitable for capturing a moving image and an LV operation to the communication mode suitable for capturing a still image. In a case where the system control unit 50 determines that the switching of the communication mode is necessary (YES in step S511), in step S512, the system control unit 50 defines the 63th byte data in the communication at the time of capturing a moving image and an LV operation illustrated in FIG. 4, as 0. Then, the system control unit 50 transmits the data to the lens system control unit 350. In a case where the system control unit 50 determines that switching of the communication mode is not necessary (NO in step S511), in step S513, the system control unit 50 defines the 63th byte data as 1 and transmits the data to the lens system control unit 350.

Figure 5B:
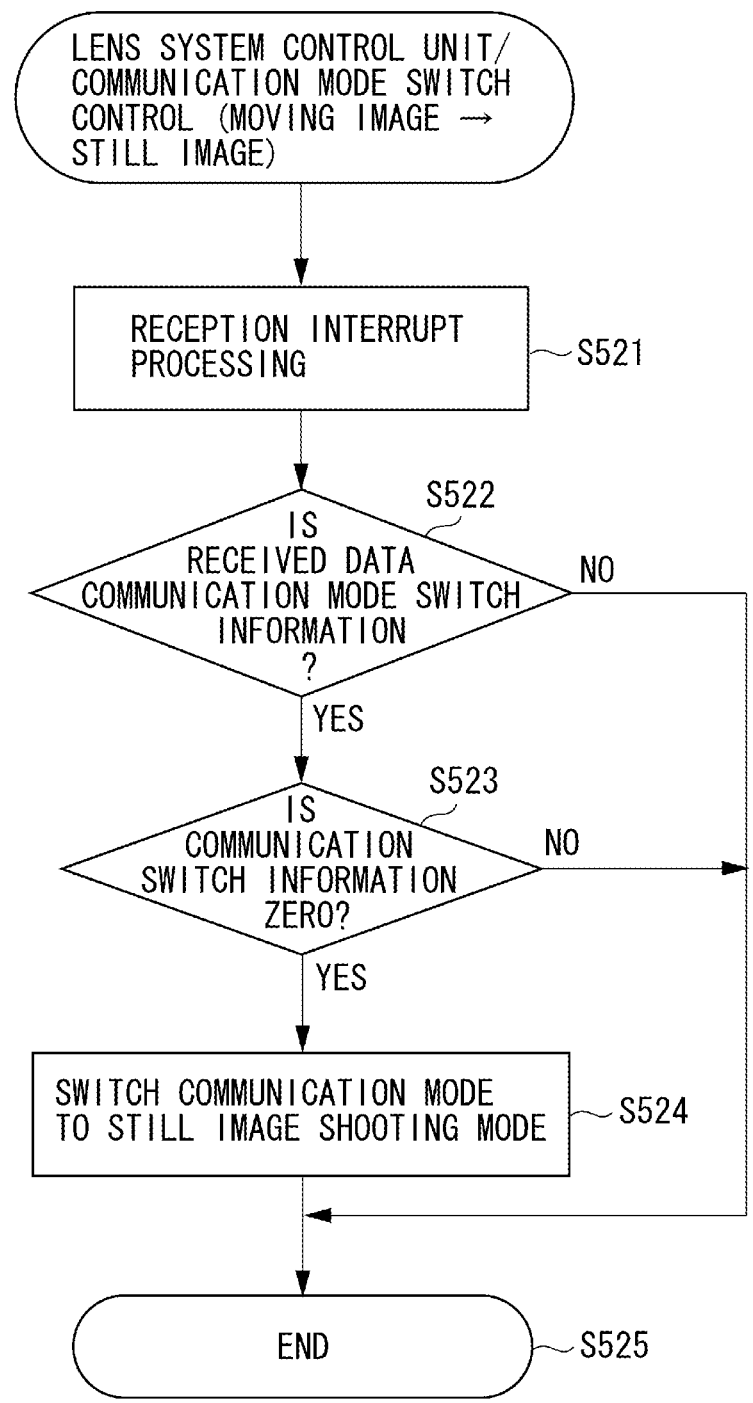

On the other hand, in the flow chart illustrated in FIG. 5B, in step S521, the lens system control unit 350 performs reception interrupt processing to receive data from the system control unit 50. In steps S522 and S523, the lens system control unit 350 determines whether the 63th byte of the received data as switch information of the communication mode is 0. In a case where the 63th byte of the received data is 0 (YES in step S523), in step S524, the lens system control unit 350 switches the communication mode to the communication mode suitable for capturing a still image. In a case where the 63th byte of the received data is 1 (NO in step S523), the lens system control unit 350 does not switch over the communication mode.

Figure 6A:
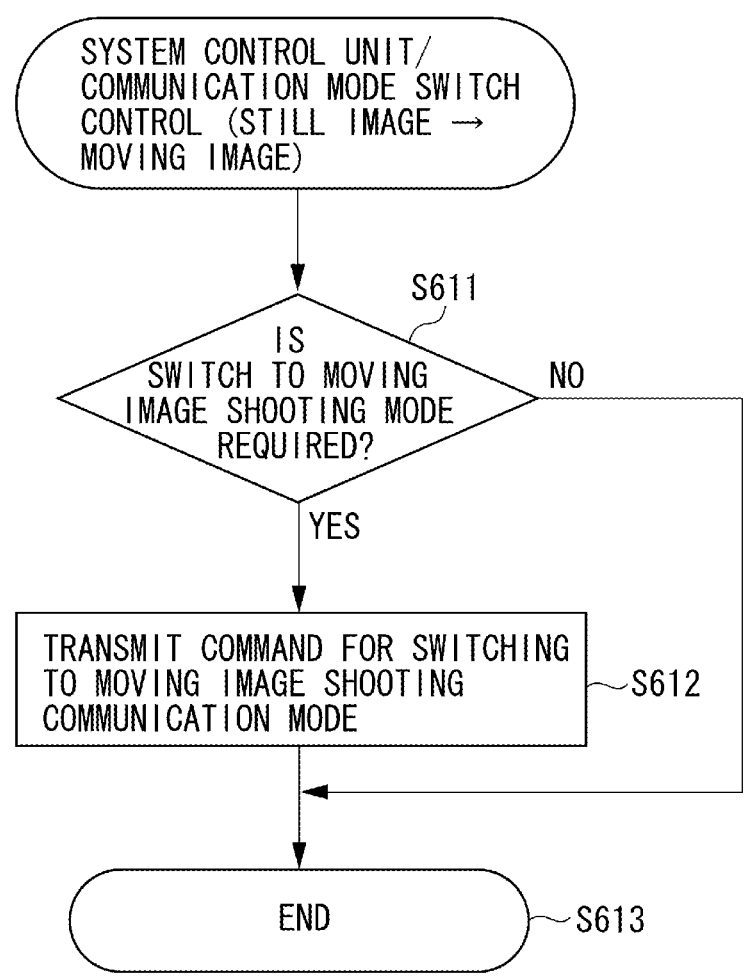

With reference to FIG. 6, a switch control for switching a communication mode from the communication mode suitable for capturing a still image to the communication mode suitable for capturing a moving image and an LV operation is described below. FIG. 6A is a flow chart illustrating a switch control for switching the communication mode from the communication mode suitable for capturing a still image to the communication mode suitable for capturing a moving image and an LV operation, in a case of the switch control executed by the system control unit 50. Similarly, FIG. 6B is a flow chart illustrating a switch control for switching the communication mode from the communication mode suitable for capturing a still image to the communication mode suitable for capturing a moving image and an LV operation in a case of the switch control executed by the lens system control unit 350.

In the flow chart illustrated in FIG. 6A, in step S611, the system control unit 50 determines whether switching of the communication mode from the communication mode suitable for capturing a still image to the communication mode suitable for capturing a moving image and an LV operation is necessary. In a case where the system control unit 50 determines that the switching of the communication mode is necessary (YES in step S611), in step S612, the system control unit 50 transmits a predetermined switching command to the lens system control unit 350 in a communication mode for capturing a still image as illustrated in FIG. 3. In a case where the system control unit 50 determines that no switching of the communication mode is necessary (NO in step S611), the system control unit 50 does not transmit the switching command to the lens system control unit 350.

On the other hand, in a flowchart illustrated in FIG. 6B, in step S621, the lens system control unit 350 performs the reception interrupt processing to receive command data from the system control unit 50. In the next step S622, the lens system control unit 350 determines whether the received command data is a switching command for switching the communication mode. In a case where the received command data is the switching command (YES in step S622), in step S623, the lens system control unit 350 switches the communication mode to the communication mode suitable for capturing a moving image and an LV operation, whereas, in a case where the received command data is not the switching command (NO in step S622), the lens system control unit 350 does not perform the switching of the communication mode.

Various processing to be executed at a side of the image capture apparatus 100 in a case where the shutter button is operated in an LV operation is described below with reference to FIG. 7.

In a case where an LV button is turned on when no LV operation is being performed, in step S701, the system control unit 50 causes the image capture apparatus 100 to start the LV operation. In other words, the system control unit 50 causes the mirror 130 to retract from the light path and causes the image display unit 29 to continuously display captured images obtained in a subsequent image capturing by the image sensor 14. In step S702, the system control unit 50 causes the image capture apparatus 100 to start communication with the lens system control unit 350 in the communication mode suitable for an LV operation.

In step S703, the system control unit 50 determines whether the shutter switch SW1 62 is turned on. In a case where the shutter switch SW1 62 is turned on (YES in step S703), the processing proceeds to step S704 where the system control unit 50 causes the image capture apparatus 100 to start preparing a still image shooting operation.

In step S704, the system control unit 50 communicates with the lens system control unit 350 to determine whether the diaphragm 312 is in a driving state. In a case where the diaphragm 312 is not in a driving state (NO in step S704), the processing proceeds to step S705, whereas, in a case where the diaphragm 312 is in the driving state (YES in step S704), the system control unit 50 waits for completion of the driving of the diaphragm 312 and advances the processing to step S705 after the completion of the driving of the diaphragm 312. The system control unit 50 determines whether the diaphragm 312 is in the driving state based on diaphragm information (i.e., second diaphragm information) transmitted from the lens system control unit 350 in the communication mode suitable in an LV operation. For example, if the lens system control unit 350 is configured to periodically transmit the information indicative of a current aperture value of the diaphragm 312 as the diaphragm information during the driving of the diaphragm 312, the system control unit 50 can determine that the driving of the diaphragm 312 is completed when the transmitted diaphragm information indicates a target aperture value.

In transmitting the diaphragm information indicative of the current aperture value of the diaphragm 312 during the driving of the diaphragm, it is possible that a difference may be generated between the aperture value indicated by the diaphragm information and the aperture value when the diaphragm information is transmitted because of a time lag between a time of detecting the aperture value and a time of transmitting the diaphragm information. Accordingly, the lens system control unit 350 may transmit information indicating that the driving of the diaphragm 312 is completed or the driving of the diaphragm 312 is not performed, as diaphragm information different from the information indicated by the current aperture value of the diaphragm 312. The system control unit 50 determines that the driving of the diaphragm 312 is completed upon receiving the diaphragm information indicating that the driving of the diaphragm 312 is completed or that the driving of the diaphragm 312 is not performed, so that more precise determination of the completion of the driving of the diaphragm 312 can be made.

In step S705, the system control unit 50 performs control to switch the communication mode from the communication mode suitable for an LV operation to the communication mode suitable for capturing a still image in a manner as illustrated in FIG. 5A. In the next step S706, the system control unit 50 performs AF processing based on image data after being subjected to various processing by the image processing circuit 20. The AF processing here may be performed based on an output from the focus detection unit 42. In this case, the mirror 130 is returned to the light path, the diaphragm 312 is opened to allow the focus detection unit 42 to detect a focal point, and the imaging lens 310 is driven. At the time, in order to open the diaphragm 312, the system control unit 50 transmits diaphragm control information indicating a driving amount required for opening the diaphragm 312 from the current aperture value, to the lens system control unit 350. Then, the mirror 130 is retracted from the light path, an aperture value of the diaphragm 312 is returned to the aperture value before the focus detection, and the LV operation is restarted.

In step S707, the system control unit 50 determines whether the shutter switch SW2 64 is turned on. In a case where the shutter switch SW2 64 is turned on (YES in step S707), the processing proceeds to step S708 where the system control unit 50 drives the diaphragm 312 to have the aperture value for capturing a still image using the communication mode suitable for capturing a still image. At the time, the system control unit 50 transmits information indicative of a driving amount of the diaphragm 312 required for changing the current aperture value to an aperture value for capturing a still image as the diaphragm control information, to the lens system control unit 350 in order to use the communication mode suitable for capturing a still image. The current aperture value here is an aperture value to be transmitted as the diaphragm control information to the lens system control unit 350 in the communication mode suitable for an LV operation before switching the communication mode to the communication mode suitable for capturing a still image.

After driving the diaphragm 312 up to the aperture value for capturing a still image, the system control unit 50 causes the image capture apparatus 100 to start the still image shooting operation.

In step S709, the system control unit 50 determines whether the shutter switch SW2 64 is turned on. In a case where the shutter switch SW2 64 is turned on (YES in step S709), the processing proceeds to step S708 where the system control unit 50 causes the image capture apparatus 100 to restart the still image shooting operation. In a case where the shutter switch SW2 64 is not turned on (NO in step S709), in step S710, the system control unit 50 determines whether the shutter switch SW1 62 is turned on. In a case where the shutter switch SW1 62 is turned on (YES in step S710), the processing proceeds to step S707, whereas, in a case where the shutter switch SW1 62 is not turned on (NO in step S710), the processing proceeds to step S711 where the system control unit 50 causes the image capture apparatus 100 to start preparing a restart of the LV operation.

In step S711, the system control unit 50 drives the diaphragm 312 so that the diaphragm 312 has the aperture value for an LV operation before capturing the still image. This is because, if the aperture values in an LV operation differ before and after capturing a still image, brightness of the captured image displayed in an LV operation varies, which gives the user a feeling of strangeness.

In step S711, the system control unit 50 communicates with the lens system control unit 350 to determine whether the diaphragm 312 is in a driving state. The system control unit 50 uses the communication mode suitable for capturing a still image here and, in order to determine whether the diaphragm 312 is in a driving state, inquires the lens system control unit 350 whether the diaphragm 312 is in a driving state. When the lens system control unit 350 receives the inquiry from the system control unit 50, the lens system control unit 350 transmits the diaphragm information indicating that the diaphragm is not in the driving state if the driving of the diaphragm 312 is completed or the driving of the diaphragm is not required. In a case where the diaphragm information indicating that the diaphragm is not in the driving state is not received from the lens system control unit 350 (YES in step S711), the system control unit 50 inquires the lens system control unit 350 as to whether the diaphragm 312 is in the driving state again.

The diaphragm information (i.e., the first diaphragm information) is transmitted in the communication mode suitable for capturing a still image. Upon receiving the diaphragm information indicating that the diaphragm 312 is not in the driving state from the lens system control unit 350, the system control unit 50 determines that the diaphragm 312 is not in the driving state (NO in step S711) and advances the processing to step S712.

In step S712, the system control unit 50 performs, as illustrated in FIG. 6A, the switch control for switching the communication mode from the communication mode suitable for capturing a still image to the communication mode suitable for an LV operation.

In the next step S713, the system control unit 50 checks a state of the LV button. In a case where the LV button is turned on (YES in step S713), the processing proceeds to step S703, whereas, in a case where the LV button is not turned on (NO in step S713), the LV operation is ended.

As described above, when the communication mode between the image capture apparatus 100 and the lens unit 300 is switched, the system control unit 50 determines whether the diaphragm 312 is in the driving state. In a case where the diaphragm 312 is in the driving state, the system control unit 50 performs the switch control of the communication mode after the driving of the diaphragm 312 is ended.

In the present exemplary embodiment, the communication mode suitable for capturing a still image differs from the communication mode suitable for capturing a moving image and an LV operation in that the diaphragm control information transmitted from the image capture apparatus 100 to control the diaphragm 312 is different from each other. More specifically, in the communication mode suitable for capturing a still image, as the diaphragm control information, information indicative of a driving amount of the diaphragm required in changing the aperture value from the current aperture value to a target aperture value is transmitted, whereas, information indicative of the target aperture value is transmitted in the communication mode suitable for capturing a moving image and an LV operation. Therefore, in a case where the system control unit 50 transmits the diaphragm control information from the image capture apparatus 100 in the communication mode suitable for capturing a still image, during driving of the diaphragm based on the diaphragm control information transmitted in the communication mode suitable for capturing a moving image and an LV operation, the driving amount of the diaphragm 312 cannot be precisely calculated on the side of the image capture apparatus 100.

On the other hand, in a case where the system control unit 50 transmits the diaphragm control information from the image capture apparatus 100 in the communication mode suitable for capturing a moving image and an LV operation while the diaphragm is driven based on the diaphragm control information transmitted in the communication mode suitable for capturing a still image, the system control unit 50 cannot precisely calculate the driving amount of the diaphragm at the side of the lens unit 300.

If the driving amount of the diaphragm 312 cannot be precisely calculated, the diaphragm cannot be controlled to have the target aperture value and thus the intended exposure control cannot be realized.

Therefore, as described above, the system control unit 50 determines whether the diaphragm 312 is in the driving state. In a case where the diaphragm 312 is in the driving state, the system control unit 50 performs the switch control of the communication mode after the driving of the diaphragm 312 is ended, thereby enabling the precise calculation of the driving amount of the diaphragm after the switching of the communication. As a result thereof, the intended exposure control can be realized.

The switch control of the communication mode in a case where the still image is captured during the LV operation is described in the above exemplary embodiment. However, also in a case where the still image is captured while capturing the moving image, the switch control of the communication mode may be performed in a similar manner.

In the first exemplary embodiment, the communication mode is switched after the driving of the diaphragm 312 is ended; however, in a second exemplary embodiment, switching timing of the communication mode differs from that of the first exemplary embodiment. More specifically, the communication mode can be switched also during the driving of the diaphragm; however, the transmission of the diaphragm control information after the switching of the communication mode is performed after the driving of the diaphragm is ended. This is because, if the diaphragm control information is not transmitted immediately after switching the communication mode, even if the communication mode is switched during the driving of the diaphragm, a problem does not arise that a precise driving amount cannot be calculated and thus the aperture value cannot be controlled up to a target aperture value.

In the present exemplary embodiment, each processing performed by the image capture apparatus 100 according to the first exemplary embodiment with reference to FIG. 7 is only substituted with the processing illustrated in FIG. 8 and the configurations of the image capture apparatus and the lens unit, and two communication modes are the same as those of the first exemplary embodiment. Therefore, the detailed descriptions thereof are omitted here.

Each processing to be performed at the side of the image capture apparatus 100 in a case where the shutter button is operated when capturing a moving image according to the present exemplary embodiment is described below with reference to FIG. 8.

In a case where the moving image button is turned on when capturing no moving image, in step S801, the system control unit 50 causes the image capture apparatus 100 to start the moving image shooting operation. In step S802, the system control unit 50 causes the image capture apparatus 100 to start communication with the lens system control unit 350 in the communication mode suitable for capturing a moving image.

In step S803, the system control unit 50 determines whether the shutter switch SW1 62 is turned on. In a case where the shutter switch SW1 62 is turned on (YES in step S803), the processing proceeds to step S804 where the system control unit 50 causes the image capture apparatus 100 to start preparing to capture the still image.

In step S804, as illustrated in FIG. 5A, the system control unit 50 performs control to switch from the communication mode suitable for capturing a moving image to the communication mode suitable for capturing a still image.

In step S805, the system control unit 50 communicates with the lens system control unit 350 to determine whether the diaphragm 312 is in the driving state. The system control unit 50 advances the processing to step S806 in a case where the diaphragm is not in the driving state (NO in step S805), whereas, the system control unit 50 advances the processing to step S806 after the driving of the diaphragm is completed in a case where the diaphragm 312 is in the driving state. When determining whether the diaphragm 312 is in the driving state made in step S805, the communication mode suitable for capturing a still image is used and its determination method is similar to that of step S711 of FIG. 7, so that a description thereof is omitted here.

In the next step S806, the system control unit 50 performs the AF processing based on the image data subjected to various processing in the image processing circuit 20. The AF processing here may be performed based on the output from the focus detection unit 42. In this case, the system control unit 50 returns the mirror 130 to the light path, opens the diaphragm 312 to allow the focus detection unit 42 to detect focal point, and drives the imaging lens 310. Thereafter, the system control unit 50 retracts the mirror 130 from the light path and returns the diaphragm 312 to the aperture value before the focus detection to restart the moving image shooting. The moving image in a period during which the moving image shooting is stopped because of the AF processing can be interpolated by using the image immediately before the shooting stop.

In step S807, the system control unit 50 determines whether the switch SW2 64 is turned on. In a case where the switch SW2 64 is turned on (YES in step S807), the processing proceeds to step S808 where the system control unit 50 drives the diaphragm 312 so that an aperture value has the aperture value in capturing a still image, in the communication mode suitable for capturing a still image. At the time, in order to use the communication mode suitable for capturing a still image, the system control unit 50 transmits information indicative of a driving amount of the diaphragm 312 required in changing the aperture value from the current aperture value to the aperture value in capturing a still image as the diaphragm control information, to the lens system control unit 350. The current aperture value here means an aperture value indicated by the diaphragm control information transmitted to the lens system control unit 350 in the communication mode suitable in an LV operation before the communication mode is switched to the communication mode suitable for capturing a still image.

After driving the diaphragm 312 to have the aperture value in capturing a still image, the system control unit 50 causes the image capture apparatus 100 to start a still image shooting operation.

In step S809, the system control unit 50 determines whether the shutter switch SW2 64 is turned on. In a case where the shutter switch SW2 64 is turned on (YES in step S809), the processing proceeds to step S808 where the system control unit 50 causes the image capture apparatus 100 to restart the still image shooting operation. In a case where the shutter switch SW2 64 is not turned on (NO in step S809), in step S810, the system control unit 50 determines whether the shutter switch SW1 62 is turned on. In a case where the shutter switch SW1 62 is turned on (YES in step S810), the processing proceeds to step S807, whereas, in a case where the shutter switch SW1 62 is not turned on (NO in step S810), the processing proceeds to step S811 where the system control unit 50 causes the image capture apparatus 100 to start preparation for restarting the moving image shooting.

In step S811, as illustrated in FIG. 6A, the system control unit 50 performs control to switch the communication mode from the communication mode suitable for capturing a still image to the communication mode suitable for capturing a moving image.

In step S812, the system control unit 50 communicates with the lens system control unit 350 to determine whether the diaphragm 312 is in the driving state. The system control unit 50 advances the processing to step S813 in a case where the diaphragm 312 is not in the driving state (NO in step S812), whereas, the system control unit 50 waits until the driving of the diaphragm 312 is ended and after the end of the driving, advances the processing to step S813 in a case where the diaphragm 312 is in the driving state (Yes in step S812). When determination is made in step S812 as to whether the diaphragm 312 is in the driving state, the communication mode suitable for capturing a moving image is used. The determination method is identical to the processing of step S704 of FIG. 7, so that a detailed description thereof is omitted here.

In the next step S813, the system control unit 50 confirms a state of a moving image button. In a case where the moving image button is turned on (YES in step S813), the processing proceeds to step S803, whereas, in a case where the moving image button is not turned on (NO in step S813), the moving image shooting is ended.

As described above, when the communication mode between the image capture apparatus 100 and the lens unit 300 is switched, the system control unit 50 determines whether the diaphragm 312 is in the driving state and, until the driving of the diaphragm 312 is ended, the system control unit 50 does not transmit the diaphragm control information in the communication mode after performing switching. In other words, until the control started based on the control information transmitted in either one of the two communication modes is ended, the system control unit 50 performs the communication control not to transmit the control information in the other communication mode. Accordingly, after the system control unit 50 becomes a state capable of precisely calculating the driving amount of the diaphragm 312, the system control unit 50 transmits the control information obtained after switching the communication mode, thereby enabling the intended exposure control.

In the above described exemplified embodiment, the switch control of the communication mode in a case where the still image is captured during the moving image shooting is described; however, the switch control of the communication mode may be performed similarly also in a case where the still image is captured in an LV operation.

In the above described two exemplary embodiments, the switch control of the communication mode and the transmission control of the control information are performed depending on whether the diaphragm is in the driving state. However, the lens unit 300 may perform the reception control of the control information. For example, in a case where the communication mode of the lens unit 300 is switched during the driving of the diaphragm 312, the diaphragm control may be performed not to drive the diaphragm 312 based on the control information received in the switched communication mode until the driving of the diaphragm 312 based on the control information received before switching the communication mode is ended.

In the above described two exemplary embodiments, the present invention is applied to the diaphragm control of the lens unit. However, the present invention can be applied also to a focus control of the imaging lens as far as it is configured to perform a control by switching the communication mode in a similar manner as the above described diaphragm control.

In a third exemplary embodiment, the diaphragm control in each communication mode is described. In the present exemplary embodiment, the configurations of the image capture apparatus and the lens unit, and two communication modes are identical to those according to the first and the second exemplary embodiments, therefore detailed descriptions thereof are omitted here. In the present exemplary embodiment, when the communication mode suitable for capturing a moving image and an LV operation is used, the lens system control unit 350 controls the diaphragm 312 to have the notified target aperture value in a case where the full aperture value is changed according to a change of the focal length of the imaging lens 310.

Figure 9:
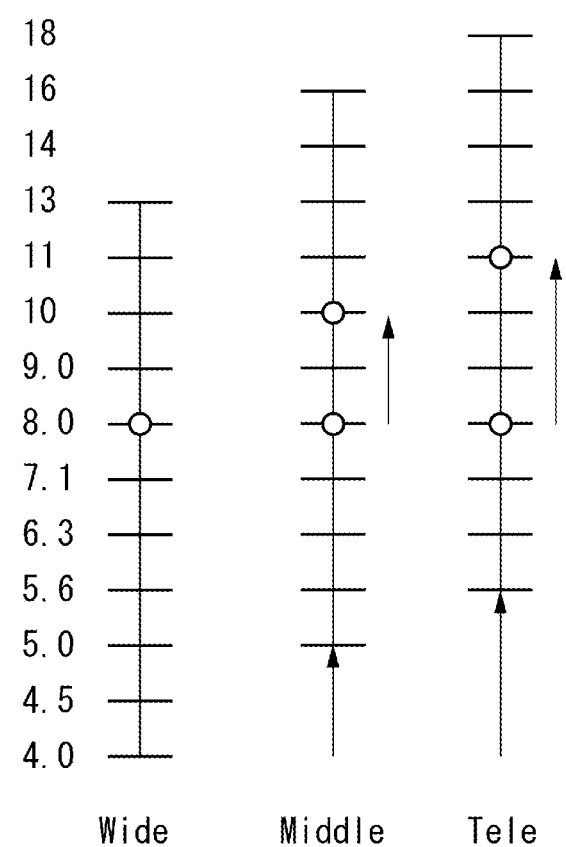
FIG. 9 is a schematic view illustrating a change of an full aperture value and a change of an effective aperture value in accordance with a change of a focal length of the lens unit.

A change of a full aperture value according to the change of the focal length and a diaphragm control according to the change of the full aperture value are described below with reference to FIG. 9. FIG. 9 is a schematic view illustrating a change of the full aperture value and a change of the effective aperture value according to the change of the focal length of the lens unit 300. The full aperture value here represents an aperture value obtainable when the diaphragm 312 is opened (i.e., when the diaphragm 312 is opened to a control end) and an effective aperture value here represents an aperture value obtainable with a diameter of an opening of the current diaphragm 312.

In an example illustrated in FIG. 9, the full aperture value when the focal length is set to Wide is 4.0, the full aperture value when the focal length is set to Middle is 5.0, and the open diaphragm value when the focal length is set to Tele is 5.6, respectively. In other words, the full aperture value changes according to the change of the focal length.

It is assumed that the focal length is changed to a Tele side from a condition that the focal length is Wide and the diaphragm 312 is controlled to have an aperture diameter with effective aperture value of 8.0.

When the focal length is changed from Wide to Middle, the full aperture value is changed from 4.0 to 5.0. In accordance therewith, the effective aperture value obtainable with the current aperture diameter of the diaphragm 312 changes from 8.0 to 10.0. When the focal length is further changed from Middle to Tele, the full aperture value is changed from 5.0 to 5.6. In accordance therewith, the effective aperture value obtainable with the current aperture diameter of the diaphragm 312 is changed from 10.0 to 11.0.

As described above, since the full aperture value is changed according to the change of the focal length, the aperture diameter of the diaphragm 312 needs to be changed in order to keep the effective aperture value.

In capturing a still image, an instruction to capture a still image is generally made after the focal length is changed, so that an amount of the diaphragm driving for obtaining a target effective aperture value can be calculated based on the full aperture value after the focal length is changed. Therefore, in order to keep the effective aperture value, it is not necessary for the aperture diameter of the diaphragm 312 to be sequentially changed in accordance with the change of the focal length.

On the other hand, the focal length is often changed in capturing a moving image and in an LV operation and thus it is required to change the aperture diameter of the diaphragm 312 in accordance with the change of the focal length such that the effective aperture value would not change before and after the change of the focal length. Therefore, in a case where information indicative of the driving amount of the diaphragm 312 is notified as the diaphragm control information, e.g., the communication mode suitable for capturing a still image, the diaphragm control information should be transmitted from the image capture apparatus 100 to the lens unit 300 every time the focal length is changed and thus the communications traffic becomes heavy.

In the communication mode suitable for capturing a moving image and an LV operation, information indicative of a target aperture value is transmitted from the image capture apparatus 100 to the lens unit 300 as the diaphragm control information. The lens system control unit 350 calculates a driving amount of the diaphragm 312 required to change the aperture value from the current aperture value to the target aperture value to drive the diaphragm 312 based on the calculated driving amount. Accordingly, when the focal length is changed, it is not necessary to transmit new diaphragm control information from the image capture apparatus 100 to the lens unit 300, and the aperture diameter of the diaphragm 312 can be automatically changed at a side of the lens unit 300 in accordance with the change of the focal length.

Figure 10:
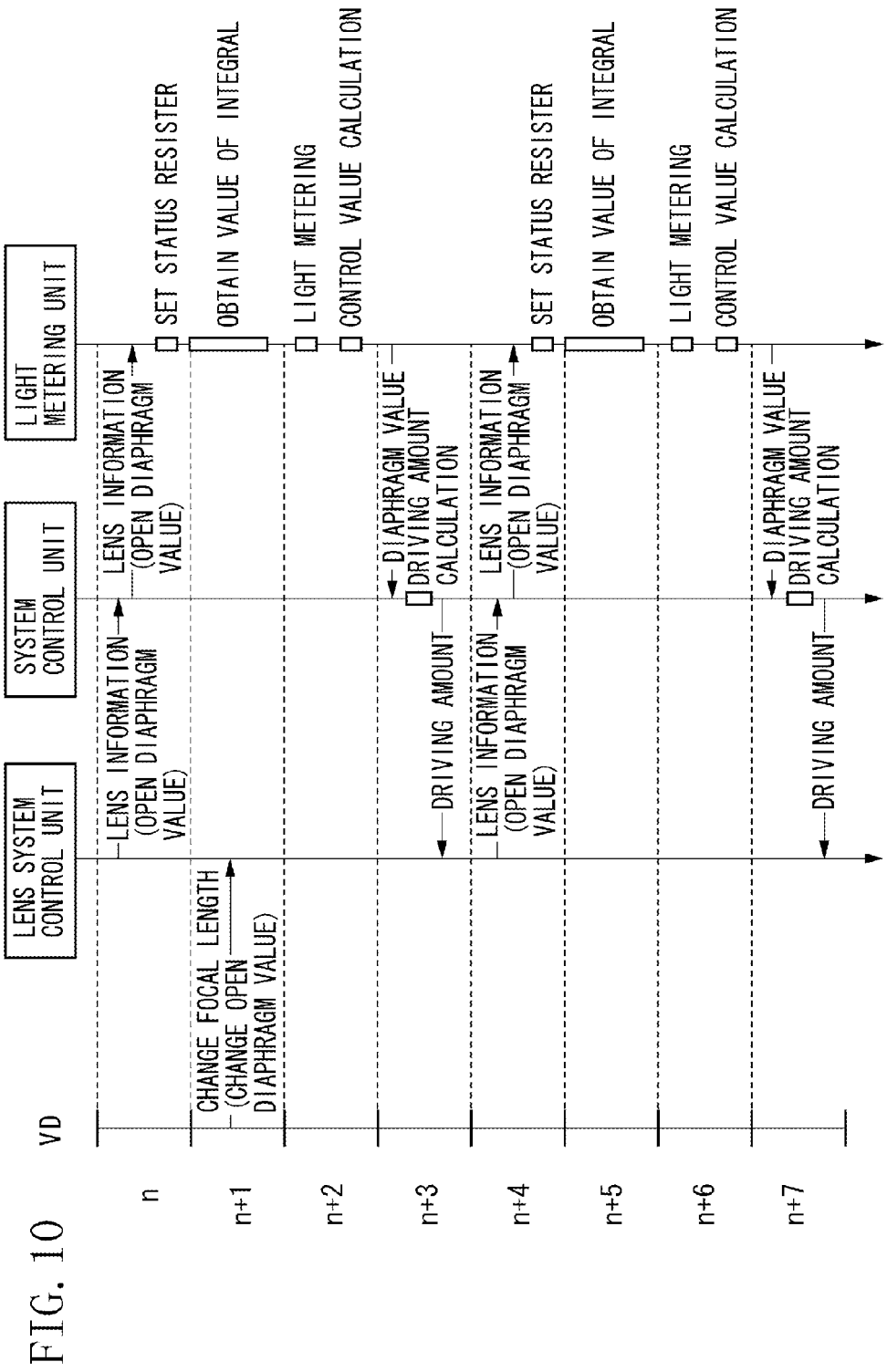
FIG. 10 illustrates processing of a diaphragm control when the communication mode suitable for capturing a still image is used.

Processing of the diaphragm control in a case where the communication mode suitable for capturing a still image is used in capturing a moving image or in an LV operation is described below with reference to FIG. 10. In FIG. 10, the VD represents a vertical synchronizing signal in capturing a moving image or in an LV operation and n to (n+7) represent a portion of a continuous frame period in capturing a moving image and in an LV operation. A downward direction of FIG. 10 corresponds to a direction that time passes.

A light metering calculation unit represents a portion relating to a light metering calculation of the system control unit 50. In order to describe the processing of the diaphragm control in detail, the light metering calculation unit is illustrated separately from the system control unit 50. In the present exemplary embodiment, the system control unit 50 includes the light metering calculation unit. However, the light metering calculation unit may be provided independently from the system control unit 50.

The system control unit 50 obtains lens information relating to the full aperture value transmitted from the lens system control unit 350 in response to a request from the system control unit 50 in n frame illustrated in FIG. 10. Subsequently, the light metering calculation unit performs a register setting to allow the image processing circuit 20 to calculate an integrated value Integ.

In the next n+1 frame, based on the image data captured by the image sensor 14 in n frame, the image processing circuit 20 calculates the integrated value Integ and the light metering calculation unit obtains thus calculated integrated value Integ.

In the next n+2 frame, the light metering calculation unit performs light metering calculation based on thus obtained lens information, the integrated value Integ, and each exposure control value (i.e., an exposure time Tv, an aperture value Av, and a capturing sensitivity Sv) when an image is captured by the image sensor 14 in the n frame. Each exposure control value here is the one obtained in the control value calculation of the last time, i.e., the control value calculation performed prior to the n frame, (i.e., a first exposure control value). The control value calculation is performed based on the light metering value obtained by the light metering calculation to obtain a new exposure control value (i.e., a second exposure control value).

In the light metering calculation, luminance CalcBv of the n frame is calculated by the following equation (1) based on the exposure time Tv, the aperture value Av, the capturing sensitivity Sv, the full aperture value PreAVEF indicated by the lens information of the last time, and the full aperture value AVEF indicated by the lens information of this time.

$$CalcBv = Tv + Av - Sv + (AVEF - PreAVEF) \quad (1)$$

In the equation (1), calculation of a difference between the full aperture value PreAVEF indicated by the lens information of the last time and the open diaphragm value AVEF indicated by the lens information of this time corresponds to the calculation of the amount of change of the effective aperture value. Therefore, the luminance CalcBv of the n frame becomes a value calculated based on the amount of change of the effective aperture value.

Next, a luminance difference ΔBv is calculated by the following equation (2) based on the integrated value Integ and the integrated value RefInteg at the time of a correct exposure.

$$\Delta Bv = \log 2(Integ/RefInteg) \quad (2)$$

The luminance (i.e., the light metering value) Bv' is calculated by the following equation (3) based on the luminance CalcBv and the luminance difference ΔBv of the n frame.

$$Bv' = CalcBv + \Delta Bv \quad (3)$$

In the control value calculation, based on the luminance Bv' obtained by the above described light metering calculation, a new exposure control value is calculated according to a program chart (not illustrated).

In the next n+3 frame, the system control unit 50 calculates the driving amount of the diaphragm 312 based on the aperture value Av among the exposure control values newly obtained by the light metering calculation unit in the n+2 frame.

In the driving amount calculation, a driving amount ΔAv is calculated by the following equation (4) based on the aperture value PreAv of the last time stored by the system control unit 50, a newly calculated diaphragm value Av, the full aperture value PreAVEF indicated by the lens information of the last time, and a full aperture value AVEF indicated by the lens information of this time.

$$\Delta Av = AV - PreAV - (AVEF - PreAVEF) \quad (4)$$

The system control unit 50 transmits the information indicative of thus obtained driving amount ΔAv to the lens system control unit 350 as the diaphragm control information. As described above, in a case where the present communication mode is used, the lens system control unit 350 does not calculate the driving amount of the diaphragm 312 as in the following case where the communication mode described below is used.

In the present communication mode, without a request from the side of the image capture apparatus 100, the lens information is not transmitted from the lens unit 300. Therefore, for example, as illustrated in FIG. 6, even if the focal length of the lens unit 300 is changed in the n+1 frame and the full aperture value is changed, the image capture apparatus 100 cannot recognize the change of the focal length of the lens unit 300 until the next request is received from the image capture apparatus 100 in n+4 frame. In other words, even if the focal length of the lens unit 300 is changed in the n+1 frame, the change of the full aperture value in accordance with the change of the focal length cannot be reflected in the driving amount calculation of the n+3 frame, so that a precise driving amount cannot be calculated. In order to reflect the change of the full aperture value, it is necessary to perform the above described series of processing, so that a time lag until the change of the full aperture value is reflected becomes longer.

On the other hand, at the time of capturing a still image, the driving amount calculation is performed at the side of the image capture apparatus 100 and the lens unit 300 only drives the diaphragm 312 based on the calculated driving amount, so that timings of the other processing relating to the still image shooting on the image capture apparatus 100 side can be controlled with ease. Consequently, in capturing a still image, i.e., in a case where the diaphragm 312 is controlled to capture a still image, the diaphragm control suitable for capturing a still image can be performed by transmitting the information indicative of the driving amount ΔAv calculated by the system control unit 50 to the lens system control unit 350 as the diaphragm control information.

Next, processing of the diaphragm control in a case where the communication mode suitable for capturing a moving image is used in capturing a moving image or in an LV operation is described below with reference to FIG. 11.

Figure 11:
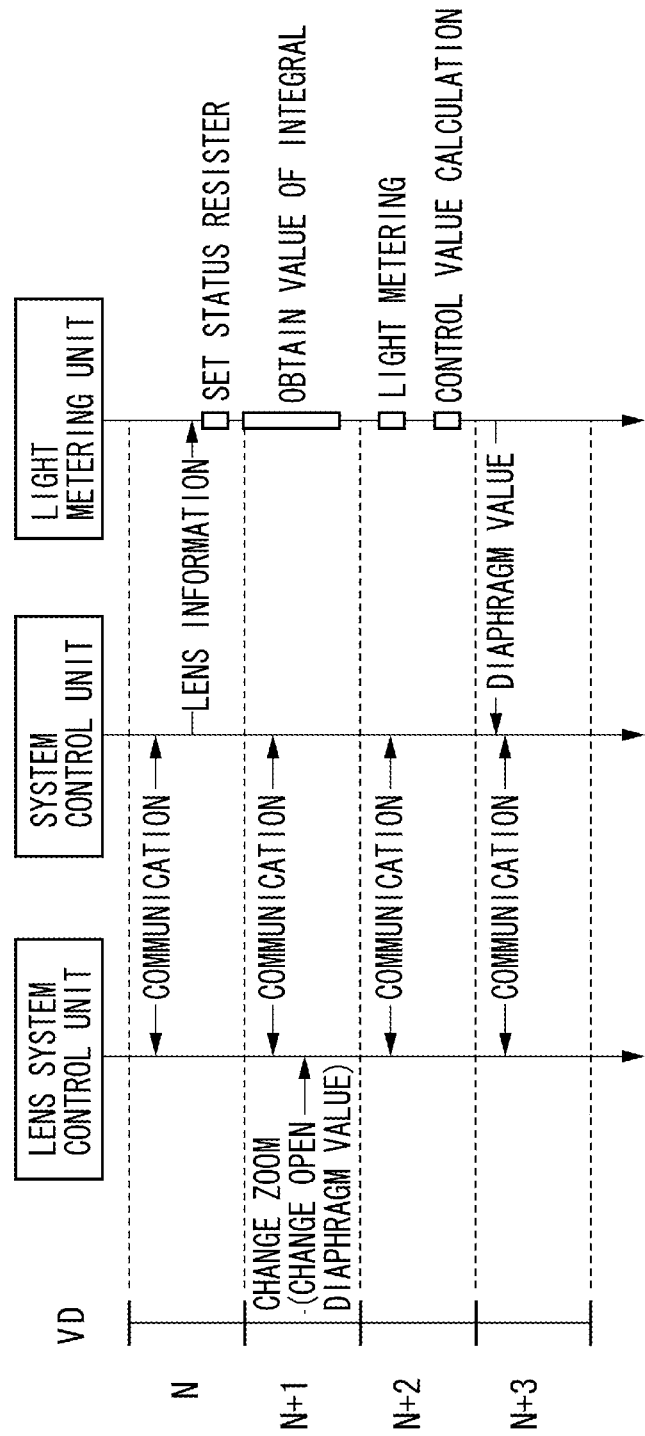
FIG. 11 illustrates processing of a diaphragm control in a case where the communication mode suitable for capturing a moving image and in an LV operation is used.

In FIG. 11, N through N+3 represent a continuous portion of each frame period in capturing a moving image or in an LV operation and other features are described in FIG. 10, so that the descriptions thereof are omitted here.

In FIG. 11, the system control unit 50 obtains lens information of the full aperture value transmitted from the lens system control unit 350 in the N frame. The light metering calculation unit makes a register setting to allow the image processing circuit 20 to calculate the integrated value Integ.

In the next N+1 frame, the image processing circuit 20 calculates the integrated value Integ based on the image data captured by the image sensor 14 in the N frame. The light metering calculation unit obtains thus calculated integrated value Integ.

In the next N+2 frame, the light metering calculation unit performs the light metering calculation based on the lens information obtained in the N frame, the integrated value Integ, and each exposure control value (e.g., the exposure time Tv, the aperture value Av, and the capturing sensitivity Sv) when an image is captured by the image sensor 14 in the N frame. Then, the light metering calculation unit performs the control value calculation based on the light metering value calculated by the light metering calculation, in order to calculate a new exposure control value.

In the light metering calculation when the present communication mode is used, the luminance By of the N frame is calculated by the following equation (5) based on the exposure time Tv, the aperture value Av, and the capturing sensitivity Sv when the image sensor 14 captured an image in the N frame.

$$Bv = Tv + Av - Sv \quad (5)$$

A luminance gap ΔBv is calculated by the above described equation (2) based on the integrated value Integ and the integrated value at the time of the correct exposure RefInteg.

The luminance (i.e., the light metering value) Bv' is calculated by the following equation (6) based on the luminance By and the luminance gap ΔBv of the N frame.

$$Bv' = Bv + \Delta Bv \quad (6)$$

In the control value calculation, a new exposure control value is calculated according to a program chart (not illustrated) based on the luminance Bv' calculated by the above described light metering calculation.

In the next N+3 frame, the light metering calculation unit transmits information indicative of the aperture value Δv in exposure control values newly calculated in the N+2 frame, i.e., information indicative of a target aperture value, to the lens system control unit 350 as diaphragm information.

Thereafter, the lens system control unit 350 calculates a driving amount of the diaphragm 312 necessary for changing the current aperture value to a target aperture value based on the diaphragm control information transmitted from the system control unit 50.

As described above, in a case where the present communication mode is used, the system control unit 50 performs the light metering calculation and the control value calculation without using the change amount of the full aperture value. This is because, in the present communication mode, even if the full aperture value and the effective aperture value change in accordance with the change of the focal length, the lens unit 300 automatically changes the aperture diameter of the diaphragm 312 in accordance with the change amount of the effective aperture value to maintain the effective aperture value. To maintain the effective aperture value means that the aperture value in the N frame is equal to the target aperture value calculated in the control value calculation of the last time even when the focal length is changed after the control calculation of the last time and, thus, consideration of the change of the full aperture value is not required in the light metering calculation.

Further, the system control unit 50 only transmits the target aperture value to the lens system control unit 350 and the driving amount calculation of the diaphragm 312 is performed by the lens system control unit 350. More specifically, for example as illustrated in FIG. 11, in a case where the focal length of the lens unit 300 is changed and thus the full aperture value is changed in the N+1 frame, the lens system control unit 350 calculates the driving amount for filling a gap between the target aperture value and the effective aperture value to drive the diaphragm 312. Accordingly, without waiting for transmission of new diaphragm control information from the image capture apparatus 100, the change of the full aperture value in accordance with the change of the focal length can be swiftly reflected.

Further, when the image capture apparatus 100 transmits the diaphragm control information, the image capture apparatus 100 is only required to calculate the target aperture value and the image capture apparatus 100 does not calculate the driving amount of the diaphragm 312, so that the calculation load of the image capture apparatus 100 can be decreased, so that a high-speed communication between the image capture apparatus 100 and the lens unit 300 can be effectively carried out. Therefore, at the time of capturing a moving image, i.e., in a case where the image capture apparatus 100 controls the diaphragm 312 in order to capture a moving image, the information indicative of the target aperture value calculated by the system control unit 50 is transmitted to the lens system control unit 350 as the diaphragm control information. Thus, a diaphragm control suitable for capturing a moving image can be performed.

As described above, in the present exemplary embodiment, different diaphragm control information is transmitted from the image capture apparatus 100 to the lens unit in each of capturing a still image, capturing a moving image, and an LV operation. Therefore, the diaphragm control suitable for each shooting condition, e.g., suitable for capturing a still image or capturing a moving image, can be performed.

The preferable exemplary embodiments of the present invention is described above. However, the present invention is not limited to these exemplary embodiments but various modifications and changes can be made without departing from the spirit and the scope of the present invention.

For example, in the third exemplary embodiment, the communication mode is switched between capturing a still image and capturing a moving image, to transmit different diaphragm control information according to the switching of the communication mode. However, the diaphragm control information may be changed instead of changing the communication mode.

In the third exemplary embodiment, assuming a case where the suitable diaphragm control differs according to a user's intention in capturing an image, the diaphragm control information to be transmitted may be switched by the user using the operation unit 70.

Further, in the third exemplary embodiment, communication modes other than the communication modes described in the first and the second exemplary embodiments may be used.

In the third exemplary embodiment, as an example, the communication mode between the image capture apparatus and the lens unit is switched between two communication modes. However, the switching may be performed between more than two communication modes according to the image shooting mode and image capturing conditions. In this case, diaphragm control information of the respective communication modes to be transmitted may be set according to the image shooting mode using the respective communication modes and an image capture condition.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-101670 filed Apr. 26, 2012 and No. 2012-130100 filed Jun. 7, 2012, which are hereby incorporated by reference herein in their entirety.

What is claimed is:

1. An image capture apparatus adapted for detachable engagement with a lens unit, the apparatus comprising:

a communication unit for communication with a lens unit, capable of switching between a first communication mode of transmitting first control information to the lens unit and a second communication mode of transmitting second control information different from the first control information to the lens unit; and a control unit configured to control communication with the lens unit;

wherein the first control information and the second control information are diaphragm control information for controlling a diaphragm included in the lens unit, and wherein the control unit performs the communication control such that, while the control based on either one of the first control information and the second control information is performed, the other one of the first control information and the second control information is not transmitted, and while the control based on the one of the first control information and the second control information is not performed, the other one of the first control information and the second control information is transmitted.

2. The image capture apparatus according to claim 1, wherein the control unit performs the communication control such that, until the diaphragm driving started based on either one of the first control information and the second control information is ended, the other one of the first control information and the second control information is not transmitted.

3. The image capture apparatus according to claim 1, wherein the control unit performs the communication control such that, until the control started based on either one of the first control information and the second control information is ended, no switching of the communication mode of the communication unit is performed.

4. The image capture apparatus according to claim 1: wherein the first control information is diaphragm control information indicative of a driving amount of a diaphragm included in the lens unit; and wherein the second control information is diaphragm control information indicative of a target aperture value of the diaphragm included in the lens unit.

5. The image capture apparatus according to claim 4, wherein the control unit performs a communication control such that the communication unit enters the first communication mode when capturing a still image, whereas, the communication unit enters the second communication mode when capturing a moving image.

6. The image capture apparatus according to claim 4, wherein the control unit performs the communication control such that the communication unit enters the first communication mode when capturing a still image, whereas, the communication mode of the communication unit enters the second communication mode when an image display unit continuously displays images sequentially captured by the image sensor.

7. The image capture apparatus according to claim 1, wherein in the first communication mode, a communication in a unit of 1 byte accompanied with a Busy period is repeated predetermined necessary times per control command.

8. The image capture apparatus according to claim 1, wherein in the second communication mode, communication is made in synchronization with a vertical synchronizing signal.

9. An image capture apparatus adapted for detachable engagement with a lens unit including a diaphragm, the apparatus comprising:

a communication unit configured to communicate with the lens unit; and a switching unit configured to switch diaphragm control information to be transmitted to the lens unit by the communication unit to control the diaphragm of lens unit, between first control information indicative of a driving amount of the diaphragm and second control information different from the first control information and indicative of a target aperture value of the diaphragm.

10. The image capture apparatus according to claim 9, further comprising: an image capturing unit configured to obtain image data by capturing an object; and an image display unit configured to display an image based on image data obtained by the image capturing unit; wherein the switching unit performs switch-over so that the second control information is transmitted in a case where the diaphragm is controlled when the image display unit sequentially displays images based on image data sequentially captured and obtained by the image capture unit.

11. The image capture apparatus according to claim 9: wherein the image capture apparatus can capture a moving image; and wherein the switching unit performs switch-over so that the second control information is transmitted in a case of controlling the diaphragm to capture the moving image.

12. The image capture apparatus according to claim 9:
wherein the image capture apparatus can capture a still image; and
wherein the switching unit performs switch-over so that the first control information is transmitted in a case of controlling the diaphragm to capture a still image.

13. The image capture apparatus according to claim 9, comprising:
a driving amount calculation unit configured to calculate a driving amount of the diaphragm;
wherein the driving amount calculation unit does not calculate the driving amount of the diaphragm in a case of transmitting the second control information.

14. The image capture apparatus according to claim 13, wherein the driving amount calculation unit calculates the driving amount of the diaphragm in a case of transmitting the first control information.

15. The image capture apparatus according to claim 9, further comprising:
a control value calculation unit configured to calculate an exposure control value based on image data obtained by the image capturing unit;
wherein, in a case where a focal length of the lens unit is changed in a period between the calculation of a first exposure control value and the calculation of a second exposure control value, the control value calculation unit calculates the second exposure control value based on the first exposure control value and the change amount of the aperture value according to the change of the focal length in a case of transmitting the first control information, and the control value calculation unit calculates the second exposure control value based on the first exposure control value without using the change amount in a case of transmitting the second control information.

16. A lens unit adapted for detachable engagement with an image capture apparatus, comprising:
a diaphragm;
a communication unit for communication with an image capture apparatus capable of switching between a first communication mode and a second communication mode; and
a diaphragm control unit configured to control the diaphragm;
wherein, while driving of the diaphragm based on either one of first control information received in the first communication mode and second control information received in the second communication mode is performed, the diaphragm control unit does not cause the lens unit to start driving of the diaphragm based on the other one of the first control information and the second control information, and while the driving of the diaphragm based on one of the first control information received in the first communication mode and the second control information received in the second communication mode is not performed, the diaphragm control unit causes the lens unit to start driving of the diaphragm based on the other one of the first control information and the second control information.

17. A lens unit adapted for detachable engagement with an image capture apparatus, comprising:
a diaphragm;
a communication unit for communication with the image capture apparatus capable of switching between a first communication mode and a second communication mode; and
a control unit configured to control communication with the image capture apparatus; wherein the control unit transmits information indicating that no driving of the diaphragm is performed, in response to an inquiry from the image capture apparatus, in the first communication mode and the control unit transmits information indicating that no driving of the diaphragm is performed regardless of inquiry from the image capture apparatus, in the second communication mode.

18. The lens unit according to claim 17, wherein, in the second communication mode, the control unit periodically transmits information indicative of a current aperture value during driving of the diaphragm and transmits information indicative of the current aperture value and information indicating that no driving of the diaphragm is performed when the driving of the diaphragm is ended.

19. The lens unit according to claim 17, wherein the control unit switches between the first communication mode and the second communication mode according to an instruction from the image capture apparatus.

20. A lens unit adapted for detachable engagement with an image capture apparatus, comprising:
a diaphragm;
a communication unit configured to communicate with the image capture apparatus;
a control unit configured to drive the diaphragm based on a driving amount indicated by a first control information in a case where the communication unit receives the first control information indicative of a driving amount of the diaphragm transmitted from the image capture apparatus, and to drive the diaphragm to have a target aperture value indicated by a second control information different from the first control information in a case where the communication unit receives the second control information indicative of the target aperture value of the diaphragm transmitted from the image capture apparatus.

21. The lens unit according to claim 20, comprising:
a calculation unit configured to calculate a driving amount of the diaphragm to control the aperture value to be the target aperture value based on the second control information transmitted from the image capture apparatus;
wherein the control unit drives the diaphragm based on the driving amount calculated by the calculation unit in a case where the communication unit receives the second control information transmitted from the image capture apparatus.

22. The lens unit according to claim 20:
wherein, in a case where a focal length of the lens unit is changed, the calculation unit calculates the driving amount of the diaphragm based on a change amount of the aperture value according to the change of the focal length; and
wherein the control unit drives the diaphragm based on the driving amount calculated by the calculation unit in a case where the focal length of the lens unit is changed.

23. The lens unit according to claim 20, wherein the calculation unit does not calculate the driving amount of the diaphragm in a case where the communication unit receives the first control information transmitted from the image capture apparatus.

24. A method for controlling communication between an image capture apparatus and a lens unit mounted on the image capture apparatus, the method comprising:
a first communication mode of transmitting first control information from the image capture apparatus to the lens unit; and
a second communication mode of transmitting second control information different from the first control information, from the image capture apparatus to the lens unit;
wherein the first control information and the second control information are diaphragm control information for controlling a diaphragm included in the lens unit, and
wherein, while the control based on either one of the first control information and the second control information is performed, the other one of the first control information and the second control information is not transmitted, and while the control based on the one of the first information and the second information is not performed, the other one of the first control information and the second control information is transmitted.

25. A method for controlling communication between an image capture apparatus and a lens unit mounted on the image capture apparatus, the method comprising:
a first communication mode of transmitting information indicating that no driving of a diaphragm included in the lens unit is performed, in response to an inquiry from the image capture apparatus; and
a second communication mode of transmitting information indicating that no driving of the diaphragm is performed from the lens unit regardless of any inquiry from the image capture apparatus.

26. A method for controlling a diaphragm included in a lens unit mounted on an image capture apparatus, wherein, while driving of the diaphragm based on either one of a first control information transmitted in a first communication mode and a second control information transmitted in a second communication mode from the image capture apparatus is performed, the driving of the diaphragm is not started based on the other one of the first control information and the second control information, and while the driving of the diaphragm based on the one of the first control information and the second information is not performed, the driving of the diaphragm is started based on the other one of the first control information and the second control information.

27. A method for controlling a diaphragm included in a lens unit mounted on an image capture apparatus, wherein, in a case where first control information indicative of a driving amount of the diaphragm is transmitted from the image capture apparatus, the diaphragm is driven based on the driving amount indicated by the first control information, whereas, in a case where second control information different from the first control information and indicative of a target aperture value of the diaphragm is transmitted from the image capture apparatus, the diaphragm is driven so that the aperture value becomes a target aperture value indicated by the second control information.

* * * * *